US012122087B2

(12) United States Patent
Morlacchi

(10) Patent No.: US 12,122,087 B2
(45) Date of Patent: Oct. 22, 2024

(54) METHOD AND DEVICE FOR APPLYING A FILM TO A THREE-DIMENSIONAL ARTICLE

(71) Applicants: MACPI S.P.A. PRESSING DIVISION, Palazzolo Sull'Oglio (IT); ALTEXA S.R.L., Busto Arsizio (IT)

(72) Inventor: Matteo Morlacchi, Busto Arsizio (IT)

(73) Assignees: MACPI S.P.A. PRESSING DIVISION, Palazzolo Sull'Oglio (IT); ALTEXA S.R.L., Busto Arsizio (IT)

( * ) Notice: Subject to any disclaimer, the term of this patent is extended or adjusted under 35 U.S.C. 154(b) by 393 days.

(21) Appl. No.: 17/763,601

(22) PCT Filed: Oct. 9, 2020

(86) PCT No.: PCT/IB2020/059491
§ 371 (c)(1),
(2) Date: Mar. 24, 2022

(87) PCT Pub. No.: WO2021/074752
PCT Pub. Date: Apr. 22, 2021

(65) Prior Publication Data
US 2022/0332036 A1   Oct. 20, 2022

(30) Foreign Application Priority Data
Oct. 18, 2019   (IT) .................. 102019000019328

(51) Int. Cl.
*B32B 41/00*   (2006.01)
*A43D 11/00*   (2006.01)
(Continued)

(52) U.S. Cl.
CPC ............ *B29C 63/28* (2013.01); *A43D 11/003* (2013.01); *B29C 63/341* (2013.01); *B29K 2995/0013* (2013.01); *B29L 2031/505* (2013.01)

(58) Field of Classification Search
CPC ..... B29C 63/28; B29C 63/341; A43D 11/003; B29K 2995/0013; B29L 2031/505
(Continued)

(56) References Cited

U.S. PATENT DOCUMENTS 3,539,768 A * 11/1970 Eisler .................. H05B 3/26
  392/437
2007/0245448 A1 * 10/2007 Bury .................... A41D 3/00
  2/108

(Continued)

FOREIGN PATENT DOCUMENTS

CH        523759 A     6/1972
WO    2016061321 A1    4/2016

OTHER PUBLICATIONS

Search Report dated Feb. 2, 2021 in corresponding International Application No. PCT/IB2020/059491, 3 pages.
(Continued)

*Primary Examiner* — Michael N Orlando
*Assistant Examiner* — Joshel Rivera
(74) *Attorney, Agent, or Firm* — MH2 TECHNOLOGY LAW GROUP LLP

(57) ABSTRACT

A device for applying a film to a three-dimensional article includes an inflatable shape having at least one opening connected or connectable to a source of heated gas. The inflatable shape is configurable in a deflated configuration and in an inflated configuration when the heated gas is introduced into the inflatable shape through the opening. The inflatable shape is configured and sized to allow an article to
(Continued)

be placed thereon, at least when the inflatable shape is in the deflated configuration. In the inflated configuration, the inflatable shape is configured for pressing against the article and for adhering, to the article, a film interposed between the inflatable shape and the article. The inflatable shape is impermeable to the heated gas and has a thermal transmittance greater than 600 W/m²K.

16 Claims, 5 Drawing Sheets

(51) Int. Cl.
    *B29C 63/28*     (2006.01)
    *B29C 63/34*     (2006.01)
    *B29L 31/50*     (2006.01)

(58) Field of Classification Search
    USPC .................. 156/60, 64, 350, 351, 378, 379
    See application file for complete search history.

(56) References Cited

U.S. PATENT DOCUMENTS

2016/0107417 A1*   4/2016   Morlacchi .......... A43B 23/0255
                                                                156/286
2018/0263319 A1     9/2018   Gallagher

OTHER PUBLICATIONS

Written Opinion dated Feb. 2, 2021 in corresponding International Application No. PCT/IB2020/059491, 4 pages.

* cited by examiner

METHOD AND DEVICE FOR APPLYING A FILM TO A THREE-DIMENSIONAL ARTICLE

CROSS-REFERENCE TO RELATED APPLICATIONS

This is a U.S. National Stage of International Application No. PCT/IB2020/059491 filed Oct. 9, 2020, pending, which claims priority to Italian Patent Application No. 102019000019328 filed Oct. 18, 2019, the entire disclosures of which are hereby incorporated by reference in their entireties.

FIELD OF THE FINDING

The object of the present invention is a method and a device for applying a film to a three-dimensional article. Such processes are also known as lamination methods and consist of making one or more films/layers adhere to an article in order to confer, to said article, particular technical properties and/or aesthetic properties. Among the articles/accessories attainable with the present invention, there are—by way of a non-limiting example—clothing articles or parts thereof (e.g. gloves, socks, elements for jackets, pants, etc.) also technical/sport, medical articles (orthopedic or containment braces), accessories (bags, backpacks, trolleys, suitcases, etc.), coatings of various nature, e.g. for furniture or for vehicles, and shoes of various type (also sport or orthopedic).

BACKGROUND OF THE FINDING

In such context, the document WO 2016/061321 is for example known, which illustrates a lamination process and a lamination machine for laminating a membrane/film on a destination surface of a three-dimensional article, such as a shoe, a glove, a clothing garment, a backpack or still other items. The lamination machine comprises an air-permeable inflatable shape provided with a shape corresponding to that of the destination surface. The membrane/film and the destination surface are arranged on the inflatable shape with a thermo-activatable adhesive placed between the membrane/film and the destination surface. The machine comprises a pump configured for pumping heated air into the shape. The heated air inflates the shape that is pressed against the film, which in turn presses against the destination surface and activates the adhesive, so as to glue the film against the destination surface.

The Applicants have observed that the processes and the apparatuses of known type, like that described above, can be improved with regard to several aspects, especially regarding the quality of the gluing with which the film is joined to the article.

The Applicants have in fact observed that the known machines and processes, like those described above, do not allow pressing and heating—in a uniform manner and with desired pressure and temperature parameters—the film and the adhesive, so as to ensure a perfect gluing.

In particular, the use of the air-permeable shape makes it difficult to reach sufficiently high pressures within the shape, since most of the pumped air is dispersed. This drawback can be overcome by means of an air pumping with higher flow rate, but with a consequent energy waste. In any case it is difficult to control the pressure exerted within the shape. Indeed, the increase of the pressure and of the temperatures within the shape following the pumping of hot air ensures that the material of the shape tends to be extended and expanded, thus widening and deforming the surface of the permeability areas of the same shape (which can for example be the space between the weft and warp in the case of a fabric or of perforations specially attained for conferring air permeability) with the ensuing reduction of the pressure that must therefore be compensated for by an increased pumping. The result is fluctuating and non-constant progression of the pressure during the lamination cycle.

In addition, in industrial use, such deformation tends to become permanent, ensuring that the original use parameters of the machinery are no longer optimal and must be constantly updated.

The Applicants have also observed that, in the known machines, the transmission of the heat from the air present in the shape to the adhesive is not optimal, since it occurs in a non-uniform manner and with a high inertia.

The Applicants have further observed that the passage of air through the air-permeable shape, as occurs in WO 2016/061321, places the membrane/film, the adhesive and the article in contact with the hot air at specific points (those where there is air permeability), and this could negatively affect the gluing properties, which do not result uniform.

SUMMARY

In such context, the Applicants have therefore set as objective that of proposing a device and a method for applying a film to a three-dimensional article which are capable of overcoming the abovementioned drawbacks.

In particular, the Applicants have set as objective that of proposing a device and a method for applying a film to a three-dimensional article which allows increasing the quality of the gluing with which the film is joined/laminated to the article. The Applicants have in particular set as objective that of proposing a device and a method for applying a film to a three-dimensional article which ensure the attainment of a suitable pressure and quick transfer and a uniform distribution of the heat necessary for activating the adhesive and joining the film to the article. The Applicants have found that the above-listed objects and still others can be substantially reached by employing an impermeable inflatable shape provided with particular characteristics of thermal transmittance (the physical entity that measures the quantity of thermal power exchanged by a body per unit of surface area and unit of temperature difference and which defines its tendency for energy exchange) and also possibly of thermal diffusivity.

The use of an inflatable element with this/these characteristic/s in fact allows obtaining a suitable transmission of the heat as well as the facilitated attainment of the necessary pressures also in the absence of air permeability.

In particular, the Applicants have found that the above-listed objects and still others can be substantially reached by a device, by a method and by a machine according to one or more of the enclosed claims and/or according to one or more of the following aspects.

According to an independent aspect, the present invention regards a device for applying a film to a three-dimensional article.

The device comprises an inflatable shape having at least one opening connected or connectable to a source of heated gas.

The inflatable shape is configurable at least in a deflated configuration and in an inflated configuration when the heated gas is introduced into the inflatable shape through said at least one opening.

The inflatable shape is configured and sized to allow an article to be placed on said inflatable shape, at least when the inflatable shape is in the deflated configuration.

In the inflated configuration, the inflatable shape is configured for pressing against the article and for adhere, to the article, a film interposed between the inflatable shape and the article.

The inflatable shape is impermeable to the heated gas.

The inflatable shape has a thermal transmittance greater than 600 W/m²K, optionally greater than 800 W/m²K, optionally greater than 1500 W/m²K (intended as ratio between the thermal conductivity measured according to the reference standard ISO 22007 and the thickness of the material).

The inflatable shape has a thermal diffusivity greater than 0.3 mm²/s, optionally greater than 0.4 mm²/s (measured according to the reference standard ISO 22007).

According to an independent aspect, the present invention regards a method for applying a film to a three-dimensional article.

The method comprises:
placing an article and a film on an inflatable shape, in which the film is interposed between the inflatable shape and the article and comprises at least one thermal adhesive placed between the film and the article;
introducing, in the inflatable shape, a heated gas for inflating the inflatable shape, pressing the inflatable shape against the film and the film against the article and activating the thermal adhesive.

In the present description and in the enclosed claims, with the term "thermal adhesive" it is intended a material comprising thermoplastic polymers, i.e. polymers formed by linear chains or chains with little branching, not bonded to each other. It is therefore sufficient to increase the temperature in order to bring them to a viscous state and thus be able to form them. The thermal adhesives have the capacity of modifying their own structure at a specific temperature (usually comprised between 60° C. and 180° C.) and then melting once such temperature is reached and cross-linking once cooled.

The inflatable shape is impermeable to the heated gas.

The inflatable shape has a thermal transmittance greater than 600 W/m²K, optionally greater than 800 W/m²K, optionally greater than 1500 W/m²K (intended as the ratio between the thermal conductivity measured according to the reference standard ISO 22007 and the thickness of the material).

The inflatable shape has a thermal diffusivity greater than 0.3 mm²/s, optionally greater than 0.4 mm²/s (measured according to the reference standard ISO 22007).

According to one aspect, the method is actuated with the device according to the invention.

According to one aspect, the device is configured for actuating the method according to the invention.

The Applicants have first of all verified that the method and the device according to the present invention allow obtaining a quality joining via lamination.

The Applicants have in particular verified that the method and the device according to the present invention allow pressing and heating—in a uniform manner and with the desired pressure and temperature parameters—the film and the adhesive, so as to ensure a stable and durable gluing.

The Applicants have also verified that the method and the device according to the present invention allow applying pressure and heat without direct contact between the gas contained within the inflatable shape and the film, the adhesive and the article preventing contaminations that could result damaging.

Further aspects of the present invention are listed hereinbelow.

In one aspect, the inflatable shape has at least one outlet connected or connectable to a discharge of the gas which, after having been introduced within the inflatable shape and partially cooled, can exit from the same so as to allow the entrance of new heated gas.

In one aspect, such discharge is manually adjustable so as to adjust a flow rate of the exiting gas.

In one aspect, the inflatable shape is defined by a flexible casing, optionally elastic.

In one aspect, the inflatable shape has the shape of a bag.

In one aspect, the inflatable shape, or the casing of the inflatable shape, comprises a woven fabric or a non-woven fabric, optionally orthogonal.

In one aspect, the inflatable shape, or the casing of the inflatable shape, comprises a synthetic fiber, optionally polyamide, polyamide 6.6, aramid, meta-aramid, para-aramid, aromatic polyamide or glass.

In one aspect, the inflatable shape, or the casing of the inflatable shape, comprises at least one layer of a gas-impermeable substance, optionally comprising at least one polymer, optionally made of silicone, silicone with high thermal conductivity, silicone rubber or fluorinated rubber (FKM).

In one aspect, the gas-impermeable substance is loaded with at least one thermally conductive substance, optionally having a thermal conductivity greater than a thermal conductivity of the polymer.

In one aspect, said at least one thermally conductive substance is selected from the group comprising: aluminum oxide ($Al_2O_3$), silicon carbide (SiC), zinc oxide (ZnO).

In one aspect, the inflatable shape, or the casing of the inflatable shape, comprises a woven fabric or a non-woven fabric, optionally in polyamide, polyamide 6.6, aramid, meta-aramid, para-aramid, aromatic polyamide or glass. In one aspect, said gas-impermeable substance is spread over the woven fabric or the non-woven fabric.

In one aspect, the inflatable shape, or the casing of the inflatable shape, has a thickness greater than 0.2 mm. In one aspect, the inflatable shape, or the casing of the inflatable shape, has a thickness smaller than 0.6 mm. In one aspect, the inflatable shape, or the casing of the inflatable shape, has a thickness of 0.3 mm.

In one aspect, the layer of the gas-impermeable substance has a thickness greater than 200 μm. In one aspect, the gas-impermeable layer has a thickness smaller than 350 μm. In one aspect, the layer of the gas-impermeable substance has a thickness 250 μm.

In one aspect, the inflatable shape, or the casing of the inflatable shape, has a mass per unit area greater than 250 g/m². In one aspect, the inflatable shape, or the casing of the inflatable shape, has a mass per unit area smaller than 350 g/m².

In one aspect, the inflatable shape, or the casing of the inflatable shape, has a mass per unit area of 300 g/m².

In one aspect, the heated gas has a temperature comprised between 60° C. and 200° C.

In one aspect, the heated gas is air.

In one aspect, provision is made for cooling the thermal adhesive in order to polymerize and stabilize it.

In one aspect, cooling the thermal adhesive comprises introducing cooled gas, optionally to a temperature comprised between 5° C. and 10° C., or an ambient temperature in the inflatable shape.

In one aspect, provision is made for extracting the heated gas from the inflatable shape while the cooled or ambient temperature gas is introduced, in order to maintain a pressure in the inflatable shape.

In one aspect, the pressure in the inflated inflatable shape is comprised between 1.5 bar and 2 bar or a differential pressure with respect to the external atmospheric pressure is comprised between 0.5 bar and 1 bar.

In one aspect, the device for applying a film to a three-dimensional article comprises at least one rigid support for supporting a respective inflatable shape.

In one aspect, the rigid support has a base, wherein the inflatable shape is constrained or constrainable with gas seal to the base at said at least one opening.

In one aspect, the rigid support comprises a collar configured for constraining, with gas seal, the inflatable shape to the base.

In one aspect, one edge of the bag defining the inflatable shape is fit on the base. In one aspect, the base has at least one inlet, optionally a plurality of inlets, for said gas; wherein said at least one inlet opens within the inflatable shape when said inflatable shape is mounted on the base.

In one aspect, said at least one inlet is connected to the gas source.

In one aspect, the base has at least one outlet, optionally a plurality of outlets, for discharging the gas from the inflatable shape.

In one aspect, the rigid support comprises a frame extended from the base and configured for supporting the inflatable shape, at least when the inflatable shape is in the deflated configuration.

In one aspect, inflatable shapes are provided with different shapes and sizes mountable on the base as a function of the article to be treated.

In one aspect, frames are provided with different shapes and sizes mountable on the base as a function of the article to be treated.

In one aspect, the present invention is also relative to a machine for applying a film to a three-dimensional article, wherein the machine comprises at least one device according to at least one of the preceding aspects.

In one aspect, the machine comprises the gas source, optionally comprising a pump, optionally comprising a tank for said gas connected to the pump.

In one aspect, the machine comprises at least one heater or a plurality of heaters configured for heating the gas.

In one aspect, said at least one heater comprises at least one electrical heating element.

In one aspect, the heater is operatively connected or connectable to the gas source and to the inflatable shape, optionally to said at least one inlet of the base, and is operatively interposed between the gas source and the inflatable shape. In one aspect, the machine comprises a selector (e.g. a valve or a system of valves) for channeling the gas from the gas source through the heater or directly in the inflatable shape.

In one aspect, the machine also comprises a cooler configured for cooling the gas.

In one aspect, the cooler is operatively connected or connectable to the gas source and to the inflatable shape, optionally to said at least one inlet of the base, and is operatively interposed between the gas source and the inflatable shape.

In one aspect, the selector is configured for channeling the gas from the gas source through the cooler or directly in the inflatable shape.

In one aspect, the machine comprises a base, in which at least one device, optionally two devices, is mounted on the base.

In one aspect, the pump and/or the heater and/or the tank and/or the cooler and/or the selector is/are housed in the base.

In one aspect, the film has technical properties, for example it is a permeable or semipermeable membrane, and/or aesthetic properties.

In one aspect, the three-dimensional article is selected from among: clothing articles or parts thereof (e.g. gloves, socks, elements for jackets, pants, etc.) also technical/sport, medical articles (orthopedic or containment braces), accessories (bags, backpacks, trolleys, suitcases, etc.), coatings of various nature, e.g. for furniture or for vehicles, and shoes of various type (also sport or orthopedic) or parts thereof, for example an upper of a shoe.

Further characteristics and advantages will be clearer from the detailed description of a preferred but not exclusive embodiment of a device, of a method and of a machine for applying a film to a three-dimensional article in accordance with the present invention.

DESCRIPTION OF THE DRAWINGS

Such description will be set forth hereinbelow with reference to the enclosed drawings, provided only as a non-limiting example, in which.

DETAILED DESCRIPTION OF ONE EMBODIMENT OF THE INVENTION

Figure 1:
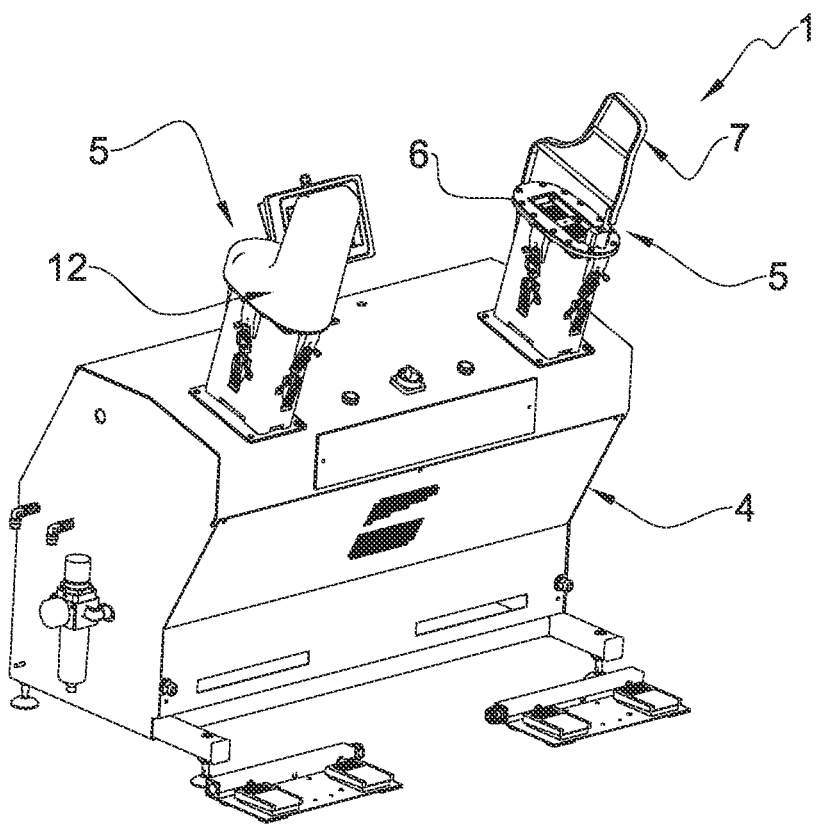
FIG. 1 is a three-dimensional view of a machine for applying a film to a three-dimensional article in accordance with the present invention.
Figure 2:
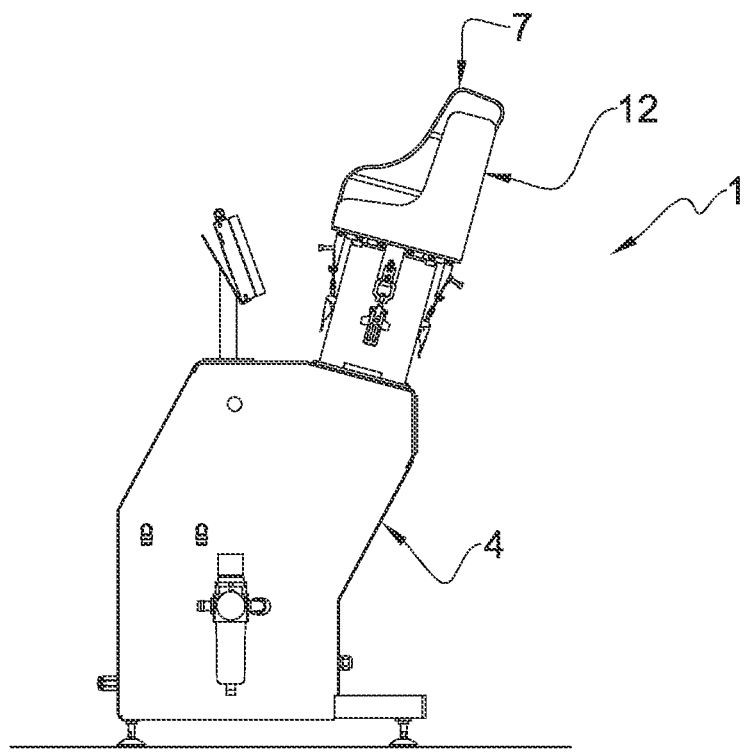
FIG. 2 is a side view of the machine of FIG. 1.

With reference to FIGS. 1 and 2, reference number 1 overall indicates a machine for applying a film to a three-dimensional article in accordance with the present invention.

Figure 7:
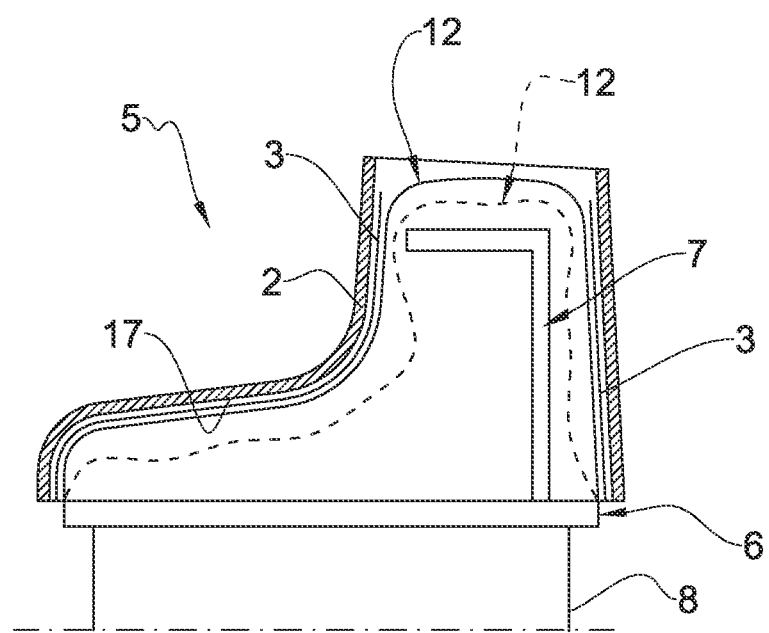
FIG. 7 illustrates schematically, and in section, steps for laminating a film on a shoe in accordance with the method according to the present invention.

The illustrated machine 1 is used for example for applying an internal coating on an upper 2 (FIG. 7) of a shoe, in which the internal coating is defined, for example, by an impermeable or semipermeable film 3 (schematically represented in FIG. 7).

The machine 1 comprises a base 4 configured for resting on the ground and containing functional elements (e.g. mechanical, electrical, electronic, pneumatic elements etc.) of the machine 1. An upper portion of the base 4 carries two devices 5 for applying the impermeable film 3 to the upper 2. Such devices 5 are identical to each other or substantially identical, so that only one of these will be described in the course of the present description.

Figure 3:
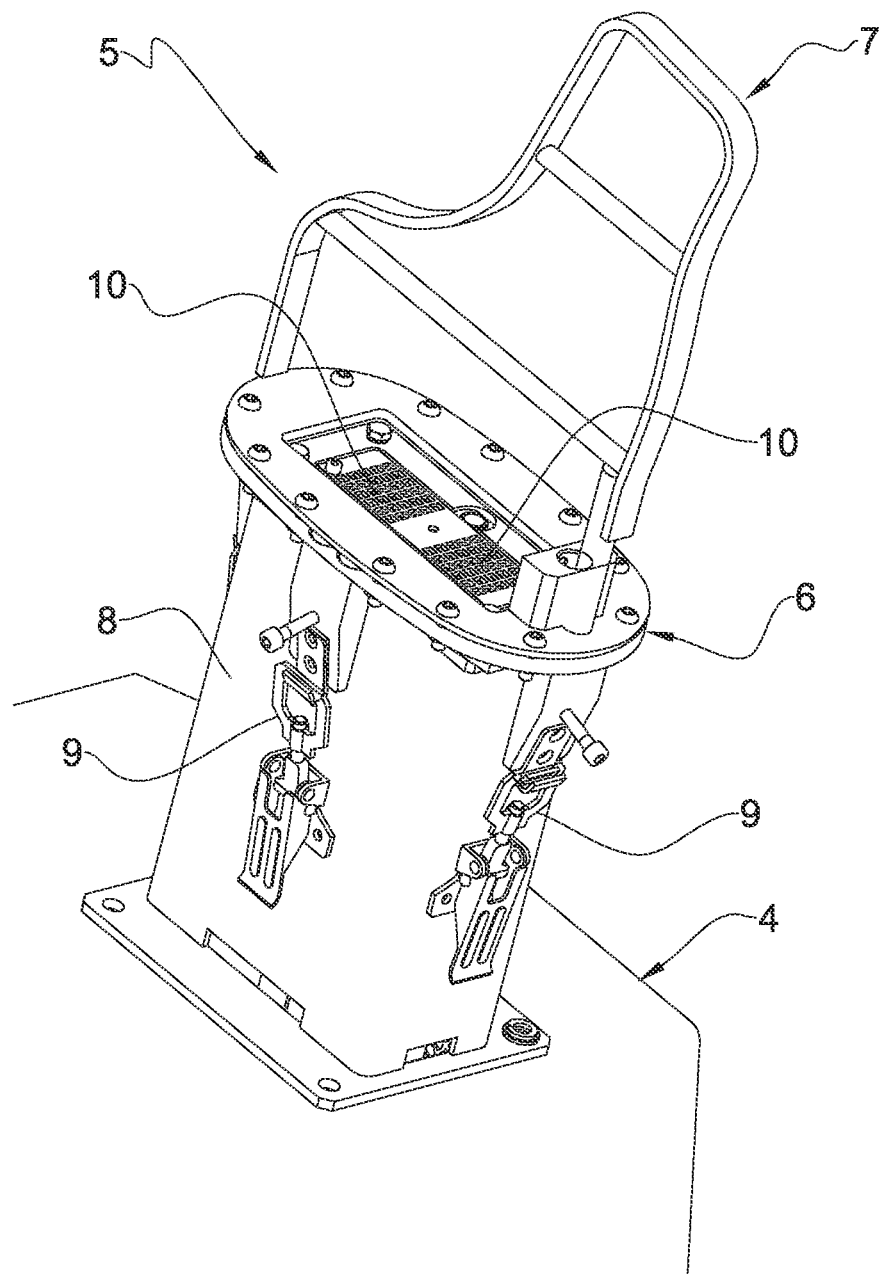
FIG. 3 is an enlarged view of a device for applying a film to a three-dimensional article belonging to the machine pursuant to FIGS. 1 and 2.
Figure 5:
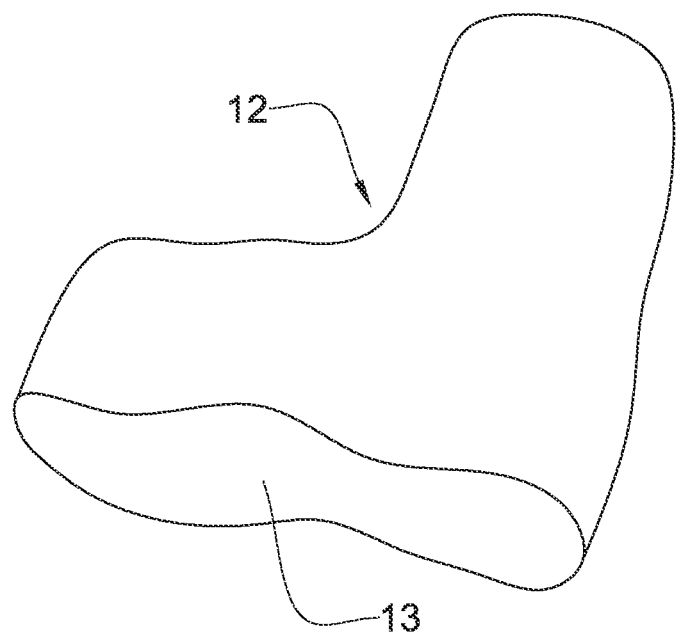
FIG. 5 illustrates an element of the device of FIGS. 3 and 4.

The device 5 comprises a rigid support in turn comprising a base 6 and a frame 7 extended from the base 6. In the non-limiting embodiment illustrated in FIGS. 3 and 5, the base is a kind of plate with size and shape similar to that of the sole of a shoe. The frame 7 is substantially extended in a plane orthogonal to the base 6. The base 6 is mounted on a support 8, in turn fixed on the base 4. In the embodiment illustrated in FIGS. 1 and 2, the device 5 is mounted, such that it can be removed from the support 8, by means of quick-release hooks 9 which connect said support 8 to the base 6 (as is more visible in FIG. 3).

Figure 4:
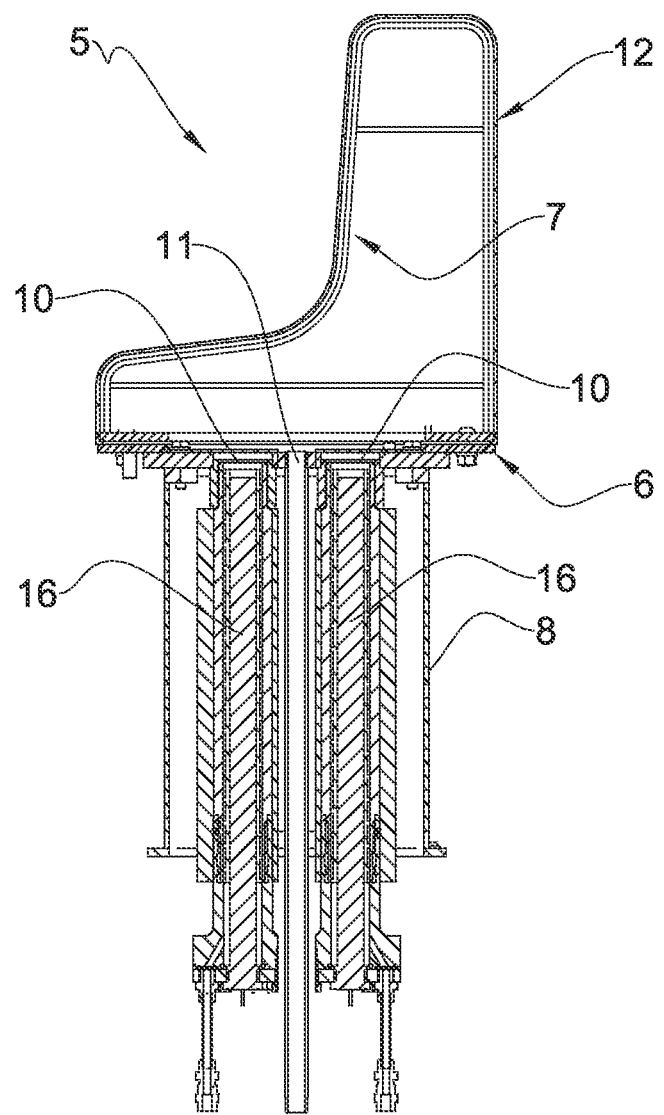
FIG. 4 is a sectional side view of the device of FIG. 3.

The base 6 has a cavity which is opened towards an upper face of the base 6 itself, from which the frame 7 is extended. The base 6 is provided with two ducts defining respective inlets 10 for a gas, which open into the cavity through respective grids. The base 6 is also provided with an additional inlet 11 (FIG. 4). The base 6 is also provided with a discharge outlet, not illustrated and, for example, parallel to the duct of the auxiliary inlet 11.

The device 5 comprises an inflatable shape 12 defined by a flexible casing or bag provided with an opening 13. In the illustrated embodiment, the bag has a shape similar to the upper 2 of a shoe, in which the opening of the bag corresponds to the sole of the shoe. The size and shape of an edge of the opening 13 of the bag are such to be able to fit the edge around a peripheral portion of the base 6. Once fit, the edge is fixed with gas seal, by means of for example a collar, not illustrated, on the base 6. The bag remains arranged around the frame 7.

FIG. 1 illustrates one of the devices 5 (on the left) provided with the inflatable shape 12 which encloses the respective frame 7, not visible, and the other of the devices 5 (on the right) in which the inflatable shape 12 is not present and therefore the respective frame 7 is visible. As can be observed, the dimensions of the frame 7 and of the inflatable shape 12 are different, so that it is possible to mount frames 7 and inflatable shapes of different shapes and sizes on the machine 1, as a function of the article to be treated.

The inflatable shape 12, i.e. the bag, is made of a gas-impermeable material. For example, the bag is made of an orthogonal fabric of synthetic yarns, e.g. of aramid, meta-aramid, para-aramid, aromatic polyamide or glass, over which a gas-impermeable substance is spread, e.g. silicone with high thermal conductivity, silicone rubber or fluorinated rubber (FKM). Such substances (polymers) are possibly loaded with thermally conductive substances such as aluminum oxide ($Al_2O_3$), silicon carbide (SiC) or with zinc oxide (ZnO).

When the inflatable shape 12 is mounted on the rigid support, as indicated above, the gas-impermeable layer remains internal.

Figure 6:
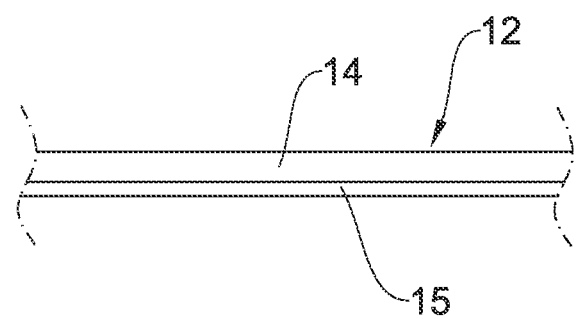
FIG. 6 illustrates a sectional portion of the element of FIG. 5.

FIG. 6 illustrates a sectional portion of the bag in which a textile layer 14 made of aramid and gas-impermeable layer made of silicone 15 are visible. The thickness of the textile layer 14 is 0.3 mm and, after the application of the silicone coating, the overall thickness is 320 μm. A mass per unit area (mass per unit of surface area) of the coated fabric is 300 g/m². The inflatable shape 12 has a thermal transmittance for example of 890 W/m²K (intended as the ratio between the thermal conductivity measured according to the reference standard ISO 22007 and the thickness of the material) and a thermal diffusivity equal to 0.44 mm²/s (measured according to the reference standard ISO 22007).

In embodiment variants, the materials used can be different from those indicated and the bag can also be elastic. For example, the casing can be made of a non-woven fabric (TNT). The material/materials used must in any case ensure the gas-impermeability and suitable properties of thermal transmittance and thermal diffusivity. The thermal transmittance is preferably higher than 600 W/m²K. The thermal diffusivity is preferably higher than 0.3 mm²/s.

The machine 1 comprises or is connected to a gas source. For example, the machine 1 comprises a pump or a compressor and a tank, not illustrated, housed in the base 4 and connected by means of ducts/pipes to the inlets 10 of the device 5. The pump is configured for pumping pressurized air into the tank. The pressurized air is conveyed, by means of suitable valves, within the inflatable shape 12 in order to determine the passage thereof from a deflated/flaccid configuration to an inflated configuration.

The machine 1 also comprises one or more heaters 16 housed in the base 4 or in the supports 8 and configured for heating the air before it is introduced into the inflatable shape 12. Each heater 16 is connected by means of pipes/ducts to the tank and to the inlets 10 of the device 5 and is operatively interposed between the tank and the inflatable shape 12. In the embodiment illustrated in FIG. 4, two heaters 16 comprising electrical heating elements are inserted in respective ducts which lead to the two inlets 10.

The machine 1 can also comprise a cooler housed in the base 4 and configured for cooling the air before it is introduced into the inflatable shape 12. The cooler, for example comprising a refrigerator, is connected by means of pipes/ducts to the tank at the additional inlet 11 of the device 5 and is operatively interposed between the pump and the inflatable shape 12.

The machine 1 comprises a selector, provided with valves and ducts, operatively coupled to the pump, to the tank, to the heaters, to the possible cooler and to the device 5. The selector is configured for selectively channeling the air from the tank through the heaters and the inlets 10, through the cooler and the additional inlet 11 or directly in the inflatable shape 12 through said additional inlet 11.

The machine 1 is also provided with an electronic control unit, with actuators, with sensors, with input-output devices (e.g. with a touch screen) in order to allow an operator to actuate it and/or program the operation thereof.

In use and in accordance with the method according to the present invention, while the inflatable shape 12 is situated in its deflated/flaccid configuration and is supported by the frame 7 (dash line in FIG. 7), an impermeable film 3 and an upper 2 of a shoe are arranged on the inflatable shape 12 in a manner such that the abovementioned film 3 remains interposed between the inflatable shape 12 and an internal destination surface 17 of the upper 2 (FIG. 7).

Alternatively, the inflatable shape 12 is partially inflated, by introducing air at ambient temperature at a pressure of about 0.5 bar through the additional inlet 11, and the impermeable film 3 with the upper 2 are arranged on the partially-inflated inflatable shape 12. The partially-inflated inflatable shape 12 is able to support the weight of the upper 2.

The film 3 is provided, on a surface thereof facing towards the destination surface 17 of the upper 2, with a thermal adhesive arranged on such surface thereof like a layer or point-like manner or in another mode. Possibly, above the upper 2, a rigid or semi-rigid shell is positioned, not illustrated.

Automatically or by means of a command imparted by the operator, the pressurized air of the tank is introduced through the heaters 16 and then into the inflatable shape 12. The heated air, e.g. heated to a temperature of 100° C., also pressurized, e.g. to a pressure of 2 bar, inflates and heats the inflatable shape 12 which in turn presses against the film 3 and presses the film 3 against the internal destination surface 17 of the upper 2. The possible rigid or semi-rigid shell mentioned above serves to contain the deformation of the upper 2. The characteristics of the casing of the inflatable shape 12 are such to transmit, in a uniform and quick manner, the heat to the film 3 and to the thermal adhesive and also to maintain a uniform pressure on such film 3. The thermal adhesive interposed between the film 3 and the destination surface 16 is therefore pressed and heated to an activation temperature thereof, at which it melts.

Optionally, during the introduction of the hot air within the inflatable shape 12, the air can be partially discharged through the discharge outlet. In this manner, the air—after having been pumped within the inflatable shape 12 and partially cooled—can exit from the shape, so as to allow the introduction of new hot air. Consequently, the temperature within the inflatable element will tend to increase. Subsequently, automatically or by means of a command imparted by the operator, air at ambient temperature or air cooled for example to 10° C. is introduced, through the additional inlet 11, while the hot air present in the inflatable shape 12 is gradually discharged through the discharge outlet. In this manner, the pressure inside the inflatable shape 12 and also the pressure of the film 3 against the upper 2 are maintained while the thermal adhesive is cooled and polymerizes, being stabilized. It is then possible to discharge the air, by deflating the inflatable shape 12, and removing the upper from the machine 1.

Tests

Lamination tests were carried out on shoe uppers obtained by means of inflatable shapes attained according to the present invention and on shoe uppers obtained with other types of inflatable shapes, one of which provided with holes for the passage of hot air.

Uppers of trekking type have been used, which were made with polyamide fabric of Cordura® type. A film 3 was used that was defined by a semipermeable membrane of polyurethane type, provided with thermal adhesive constituted by a thermo-reactivatable glue net. Hot air (130° C.) was pumped within the inflatable shape 12 so as to maintain an overpressure (with respect to the external atmospheric pressure) within said inflatable shape 12 of about 60 KPa (0.6 bar) and thus the lamination of the film 3 to the internal destination surface 17 of the upper 2 was obtained. Once the upper-film assembly was cooled, the force necessary for delaminating the film 3 from the upper 2 was measured, according to the standard ISO 2411:2000 (E). In particular, samples were picked up (strips of 50 mm width×200 mm length) of the upper-film assembly from different areas of the upper 2, with corners different from each other and overall representative of the entire internal surface of the upper 2 itself.

The inflatable shape types and the relative results of the delamination tests are reported in the following table.

| | Fabric base of the inflatable shape | Air-impermeable coating of the inflatable shape | Perforation | Thickness mm × $10^{-3}$ | Transmittance W/$m^2$K | Average resistance to delamination N/50 mm |
|---|---|---|---|---|---|---|
| 1 | Meta-aramid canvas | Silicon rubber RTV with $Al_2O_3$ | NO | 320 | 890 | 25 |
| 2 | Fiberglass canvas | Silicon rubber rtv | NO | 500 | 750 | 17 |
| 3 | Polyester mesh | Silicon rubber rtv | NO | 800 | 550 | 7 |
| 4 | Polyester mesh | Silicon rubber RTV | YES (holes ⌀ 0.5 mm with density 10 k × $m^2$) | 800 | 230 | <3 |

As can be observed, the values of adhesion of the film to the upper of the assemblies, obtained by means of the inflatable shapes according to the present invention (lines 1 and 2 of the preceding table), are decidedly higher than those of the assemblies obtained by means of the comparison inflatable shapes (lines 3 and 4).

In particular, the values of adhesion of the film 3 to the upper 2 joined by means of the inflatable shape with transmittance of about 900 W/$m^2$K (line 1 of the preceding table) were always constant and higher than 25N/50 mm. These values are on average more than 50% higher than the values detected with machines that are similar but use inflatable shapes that are permeable to hot air (e.g. like that described in the document WO 2016/061321).

It is also observed that there is a considerable increase of the values of the average resistance to delamination (from 7 N/50 mm to 17 N/50 mm) in the passage from the comparison inflatable shape with transmittance of 550 W/$m^2$K (line 3) to that according to the invention with transmittance of 750 W/$m^2$K (line 2).

The invention claimed is:

1. Device for applying a film to a three-dimensional article, comprising:
   an inflatable shape (12) having at least one opening (13) connected or connectable to a source of heated gas;
   wherein the inflatable shape (12) is configurable in a deflated configuration and in an inflated configuration when the heated gas is introduced into the inflatable shape (12) through said at least one opening (13);
   wherein the inflatable shape (12) is configured and sized to allow an article (2) to be placed on said inflatable shape (12), at least when the inflatable shape (12) is in the deflated configuration;
   wherein in the inflated configuration, the inflatable shape (12) is configured for pressing against the article (2) and for adhering, to the article (2), a film (3) interposed between the inflatable shape (12) and the article (3);
   the inflatable shape (12) being impermeable to the heated gas; and
   the inflatable shape (12) having a thermal transmittance greater than 600 W/$m^2$K.

2. The device according to claim 1, wherein the thermal transmittance is greater than 800 W/$m^2$K.

3. The device according to claim 2, wherein the inflatable shape (12) has a thermal diffusivity greater than 0.3 mm$^2$/s.

4. The device according to claim 3, wherein the inflatable shape (12) comprises a woven fabric or a non-woven fabric.

5. The device according to claim 4, wherein the inflatable shape (12) comprises a synthetic fiber.

6. The device according to claim 5, wherein the inflatable shape (12) comprises at least one layer of a gas-impermeable substance (15).

7. The device according to claim 6, wherein the layer of the gas-impermeable substance has a thickness comprised between 200 μm and 350 μm.

8. The device according to claim 7, wherein the inflatable shape (12) has a mass per unit area comprised between 250 g/m$^2$ and 350 g/m$^2$.

9. The device according to claim 8, wherein the inflatable shape (12) has a thickness comprised between 0.2 mm and 0.7 mm.

10. Method for applying a film to a three-dimensional article, comprising:
   placing an article (2) and a film (3) on an inflatable shape (12), wherein the film (3) is interposed between the inflatable shape (12) and the article (2) and comprises at least one thermal adhesive placed between the film (3) and the article (2);
   introducing, in the inflatable shape (12), a heated gas for inflating the inflatable shape (12), pressing the inflatable shape (12) against the film (3) and the film (3) against the article (2) and activating the thermal adhesive;
   wherein the inflatable shape (12) is impermeable to the heated gas; and
   wherein the inflatable shape (12) has a thermal transmittance greater than 600 W/m$^2$K.

11. The device according to claim 6, wherein the at least one layer of a gas-impermeable substance (15) comprises at least one polymer.

12. The device according to claim 11, where the at least one layer of a gas-impermeable substance (15) is made of silicone.

13. The device according to claim 12, wherein the at least one layer of a gas-impermeable substance (15) is loaded with at least one thermally conductive substance.

14. The device according to claim 13, wherein the at least one thermally conductive substance has a thermal conductivity greater than a thermal conductivity of said at least one polymer.

15. The device according to claim 3, wherein the inflatable shape (12) has a thermal diffusivity greater than 0.4 mm$^2$/s.

16. The device according to claim 5, wherein the synthetic fiber is aramid.

* * * * *